US008683285B2

(12) United States Patent
Regula

(10) Patent No.: US 8,683,285 B2
(45) Date of Patent: Mar. 25, 2014

(54) PARALLEL PACKETIZED INTERCONNECT WITH SIMPLIFIED DATA LINK LAYER

(75) Inventor: Jack Regula, Chapel Hill, NC (US)

(73) Assignee: PLX Technology, Inc., Sunnyvale, CA (US)

( * ) Notice: Subject to any disclaimer, the term of this patent is extended or adjusted under 35 U.S.C. 154(b) by 571 days.

(21) Appl. No.: 12/980,602

(22) Filed: Dec. 29, 2010

(65) Prior Publication Data

US 2012/0173945 A1 Jul. 5, 2012

(51) Int. Cl.
*G08C 25/02* (2006.01)
*H04L 1/18* (2006.01)

(52) U.S. Cl.
USPC ........... 714/748; 714/744; 375/219; 375/354; 375/226; 710/100; 327/215; 370/412; 370/465; 370/402

(58) Field of Classification Search
USPC .................. 375/219, 374; 327/215; 710/100; 714/748, 744
See application file for complete search history.

(56) References Cited

U.S. PATENT DOCUMENTS

| | | | | | |
|---|---|---|---|---|---|
| 4,700,342 | A | * | 10/1987 | Egami | 370/402 |
| 4,756,006 | A | * | 7/1988 | Rickard | 375/219 |
| 5,216,667 | A | * | 6/1993 | Chu et al. | 370/276 |
| 5,469,473 | A | * | 11/1995 | McClear et al. | 375/219 |
| 5,715,405 | A | * | 2/1998 | McClear et al. | 710/100 |
| 6,185,620 | B1 | * | 2/2001 | Weber et al. | 709/230 |
| 7,957,500 | B2 | * | 6/2011 | Sanduleanu et al. | 375/374 |
| 2002/0163932 | A1 | * | 11/2002 | Fischer et al. | 370/465 |
| 2003/0065869 | A1 | * | 4/2003 | Balay et al. | 710/314 |
| 2004/0041610 | A1 | * | 3/2004 | Kundu | 327/215 |
| 2004/0210320 | A1 | * | 10/2004 | Pandya | 700/1 |
| 2006/0082811 | A1 | * | 4/2006 | Gardner et al. | 358/1.15 |
| 2006/0165200 | A1 | * | 7/2006 | Wagner et al. | 375/354 |
| 2006/0206655 | A1 | * | 9/2006 | Chappell et al. | 710/315 |
| 2007/0171747 | A1 | * | 7/2007 | Hunter et al. | 365/207 |
| 2007/0180413 | A1 | * | 8/2007 | Park | 716/5 |
| 2008/0238489 | A1 | * | 10/2008 | Sanduleanu et al. | 327/42 |
| 2009/0268747 | A1 | * | 10/2009 | Kurata et al. | 370/412 |

OTHER PUBLICATIONS

McGrath, "Proposal for Parallel SCSI: Increase Transfer Rate and Improve Error Detection", Jun. 1998, T10/98-177 r2, pp. 1-8.*
Lattice, "Parallel RapidIO Physical Layer Interface IP Core", Oct. 2005, Lattice Semiconductor Coorporation, p. 1-27.*

* cited by examiner

*Primary Examiner* — Joshua P Lottich
*Assistant Examiner* — Jeison C Arcos
(74) *Attorney, Agent, or Firm* — Beyer Law Group LLP

(57) ABSTRACT

In a first embodiment of the present invention, a method for error-correcting in a parallel interconnect transmitting device is provided, the method comprising: detecting a frame transition in a transmission from the transmitting device to a parallel interconnect receiving device; tracking time between the frame transition and a transition of a response signal corresponding to the frame transition received from the receiving device; detecting an error in the transmission; and restarting a portion of the transmission in response to the error, wherein the size of the portion of the transmission to restart is based upon the tracked time between the frame transition and the transition of a response signal corresponding to the frame transition.

21 Claims, 7 Drawing Sheets

PARALLEL PACKETIZED INTERCONNECT WITH SIMPLIFIED DATA LINK LAYER

BACKGROUND OF THE INVENTION

1. Field of the Invention

The present invention relates generally to electronic communication. More specifically, the present invention relates a parallel packetized interconnect with a simplified data link layer.

2. Description of the Related Art

The Peripheral Component Interface (PCI) was a communication standard utilizing parallel busses to connect devices in a computer system topology. While it was extremely popular in its day, it has largely been supplanted by the newer PCI Express (PCIe) standard, which replaces the parallel bus system with a serial, point-to-point scheme.

There are a number of existing devices, however, such as field programmable gate arrays (FPGA) that still utilize parallel interfaces despite the popularity of PCIe. It is therefore desirable to design PCIe switches that are compatible with both PCIe devices and older, parallel interconnect devices.

Traditionally, a parallel packetized interconnect was implemented using a first-in-first-out (FIFO) to FIFO packet based interconnect. One problem is that prior art FIFO-to-FIFO packet based interconnects either don't have error checking mechanisms or, even if they do, there is no ability to backup and replay a portion of the communication once an error, such as a parity error, is detected.

What is needed is a solution that solves these problems.

SUMMARY OF THE INVENTION

In a first embodiment of the present invention, a method for error-correcting in a parallel interconnect transmitting device is provided, the method comprising: detecting a frame transition in a transmission from the transmitting device to a parallel interconnect receiving device; tracking time between the frame transition and a transition of a response signal corresponding to the frame transition received from the receiving device; detecting an error in the transmission; and restarting a portion of the transmission in response to the error, wherein the size of the portion of the transmission to restart is based upon the tracked time between the frame transition and the transition of a response signal corresponding to the frame transition.

In a second embodiment of the present invention, an error-correcting parallel interconnect transmitting device is provided comprising a transmit first-in-first-out (FIFO) buffer; an interface configured to: detect a frame transition in a transmission from the transmitting device to a parallel interconnect receiving device; track time between the frame transition and a transition of a response signal corresponding to the frame transition received from the receiving device; detect an error in the transmission; and restart a portion of the transmission stored in the transmit FIFO buffer, wherein the size of the portion of the transmission to restart is based upon the tracked time between the frame transition and the transition of a response signal corresponding to the frame transition.

In a third embodiment of the present invention, an error-correcting parallel interconnect transmitting device is provided comprising: means for detecting a frame transition in a transmission from the transmitting device to a parallel interconnect receiving device; means for tracking time between the frame transition and a transition of a response signal corresponding to the frame transition received from the receiving device; means for detecting an error in the transmission; and means for restarting a portion of the transmission in response to the error, wherein the size of the portion of the transmission to restart is based upon the tracked time between the frame transition and the transition of a response signal corresponding to the frame transition.

In a fourth embodiment of the present invention, a program storage device readable by a machine tangibly embodying a program of instructions executable by the machine to perform a method for error-correcting in a parallel interconnect transmitting device is provided, the method comprising: detecting a frame transition in a transmission from the transmitting device to a parallel interconnect receiving device; tracking time between the frame transition and a transition of a response signal corresponding to the frame transition received from the receiving device; detecting an error in the transmission; and restarting a portion of the transmission in response to the error, wherein the size of the portion of the transmission to restart is based upon the tracked time between the frame transition and the transition of a response signal corresponding to the frame transition.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Figure 1:
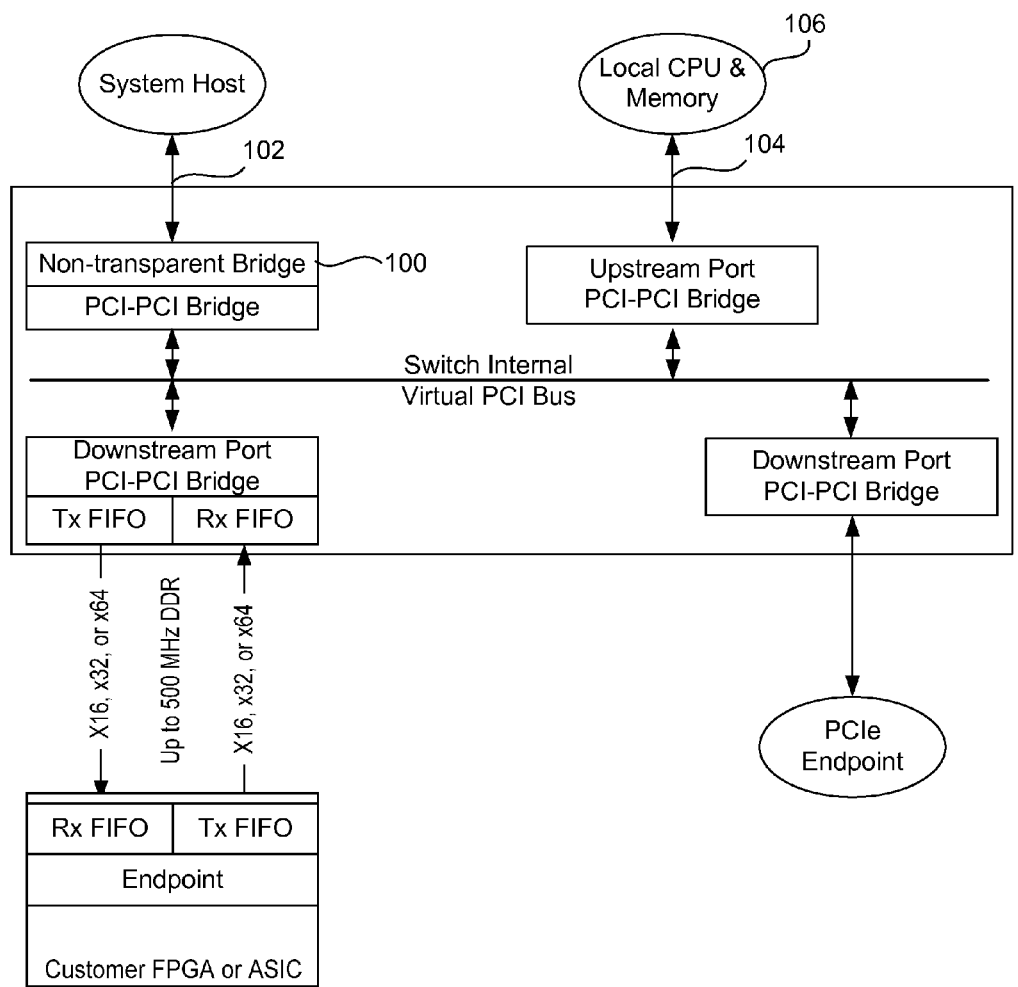
FIG. 1 is a diagram illustrating the usage of a PCIe switch with a parallel interconnect interface in accordance with an embodiment of the present invention.

In an embodiment of the present invention, a switch is provided that provides PCIe switching capabilities while also acting as a transceiver for a parallel interconnect-compatible FPGA or Application Specific Integrated Circuit (ASIC). In one embodiment, four of the PCIe lanes of one port are replaced by a parallel interconnect amenable to implementation in low-end FPGAs or ASIC technologies. FIG. 1 is a diagram illustrating the usage of a PCIe switch with a parallel interconnect interface in accordance with an embodiment of the present invention. In this usage, a non-transparent bridge 100 isolates a system host port 102 from a 3-port local domain 104. The local domain 104 is managed by a local processor 106, which is provided with a port into a customer FPGA or ASIC via a parallel interconnect and a conventional downstream port.

Figure 2:
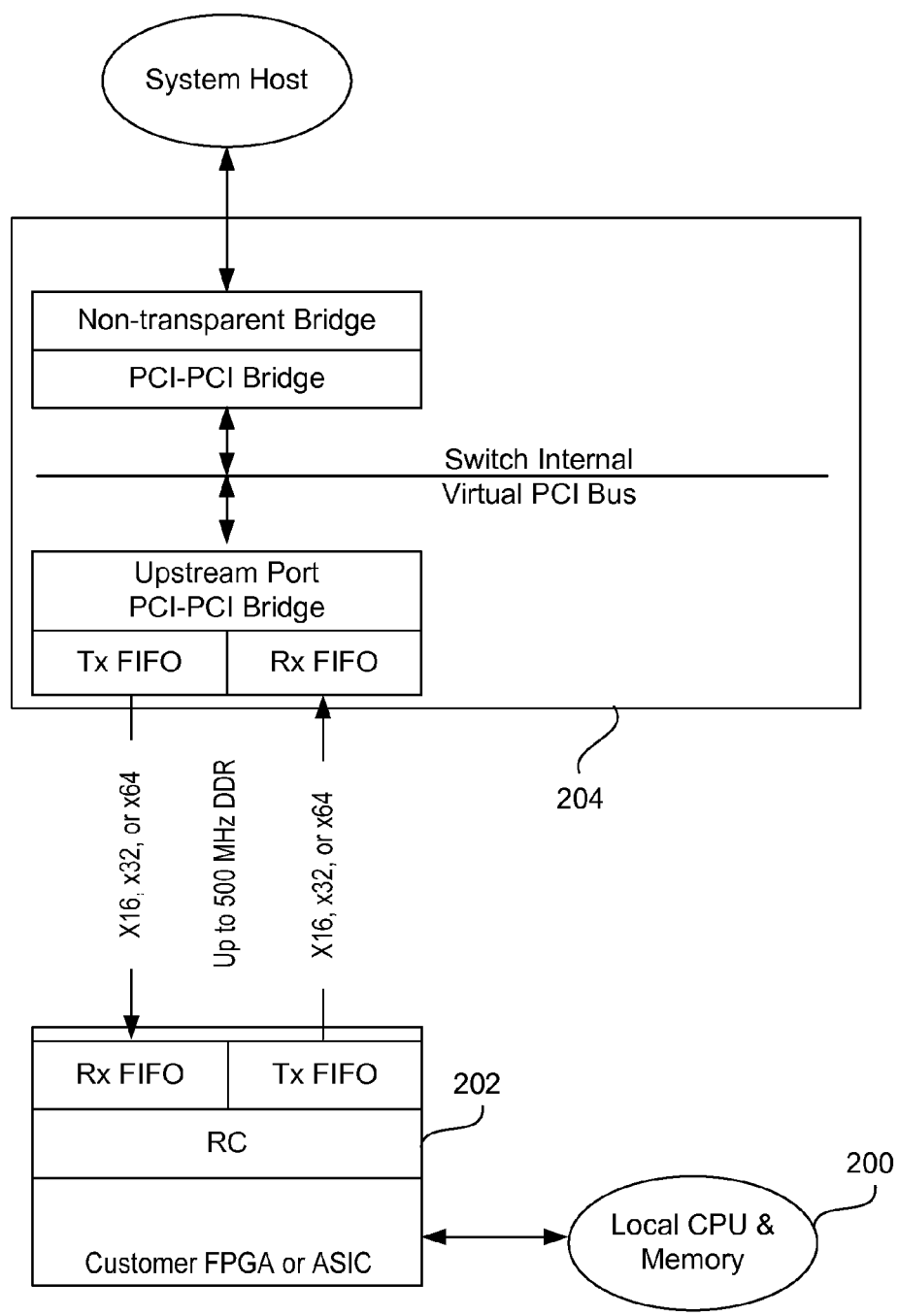
FIG. 2 is a diagram illustrating the usage of a PCIe switch with a parallel interconnect interface in accordance with another embodiment of the present invention.

FIG. 2 is a diagram illustrating the usage of a PCIe switch with a parallel interconnect interface in accordance with another embodiment of the present invention. Here, the local processor and its memory 200 are attached to the FPGA/ASIC 202 instead of the switch 204. Connecting the local CPU to the FPGA allows potentially higher processing and memory bandwidth as only the Input/Output (I/O) data sent between the system host and the FPGA/ASIC have to pass across the bandwidth-limited chip-to-chip link. The parallel port is then the upstream port of the switch.

Figure 3:
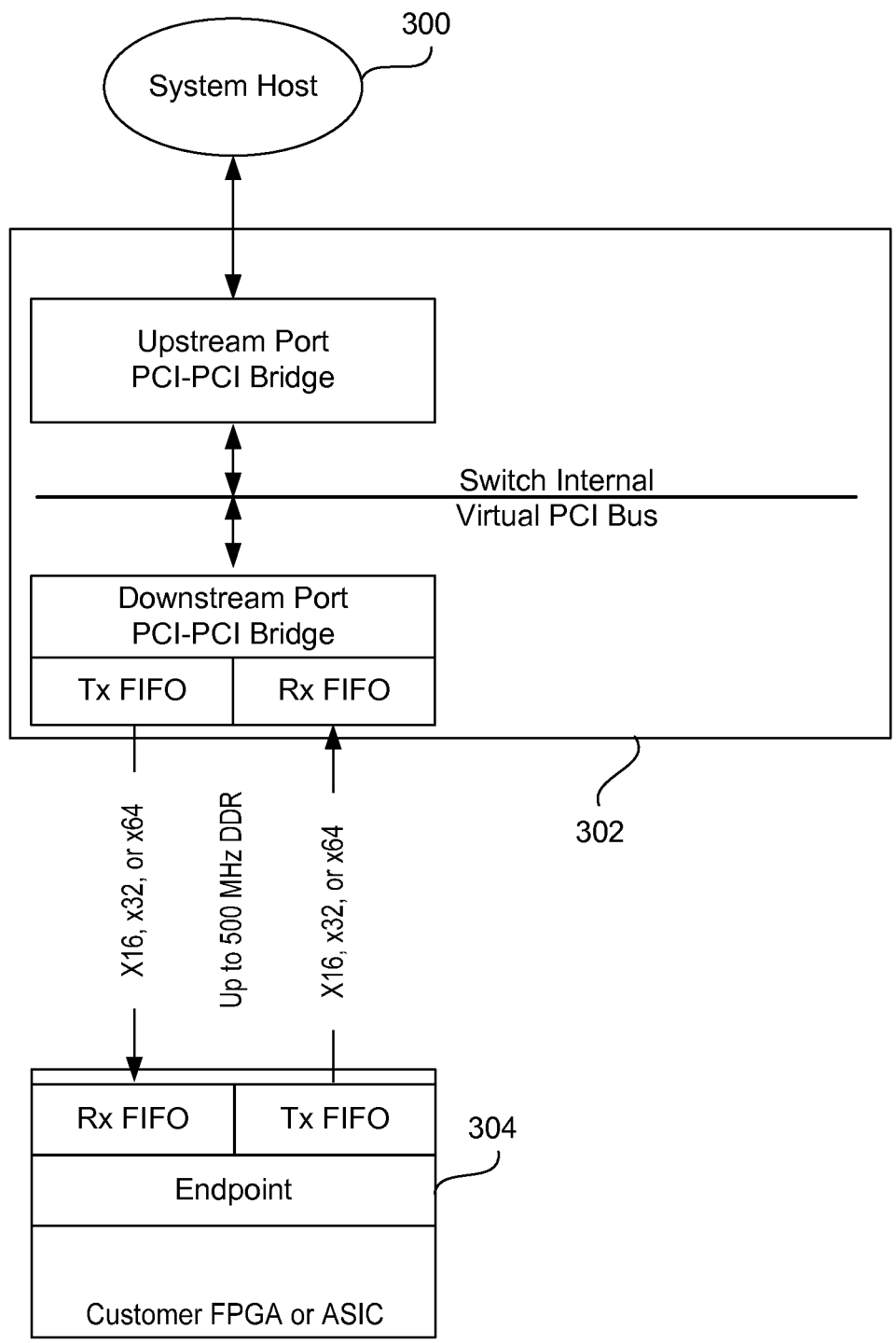
FIG. 3 is a diagram illustrating the usage of a PCIe switch with a parallel interconnect interface in accordance with another embodiment of the present invention.

FIG. 3 is a diagram illustrating the usage of a PCIe switch with a parallel interconnect interface in accordance with another embodiment of the present invention. Here, there is no embedded processor. The system host 300 has a transparent path into the switch 302 and the FPGA/ASIC endpoint 304 for configuration.

In all these usages, a commodity FPGA or ASIC can be used instead of a high-end device with an embedded (expensive) PCIe Serial/Deserializer (SERDES).

In an embodiment of the present invention, parity errors are signaled to the transmitter. These parity errors serve two purposes. The first is to simply signal to the transmitter that a parity error has been detected (and thus alert the transmitter to retry). The second is to measure the roundtrip delay. Once the transmitter knows the roundtrip delay, it can use that information to determine the number of beats (clock cycles) to backup for a replay.

On the receiver side, when a receiver detects a parity error, it drops the entire double beat containing the errors and drops and ignores all subsequent double beats until it sees a start of replay message. It then can resume capturing incoming double beats into its receive FIFO. A double beat is defined as the data on the parallel bus coincident with both the rising and the next falling edge of the associate clock signal.

Figure 4:
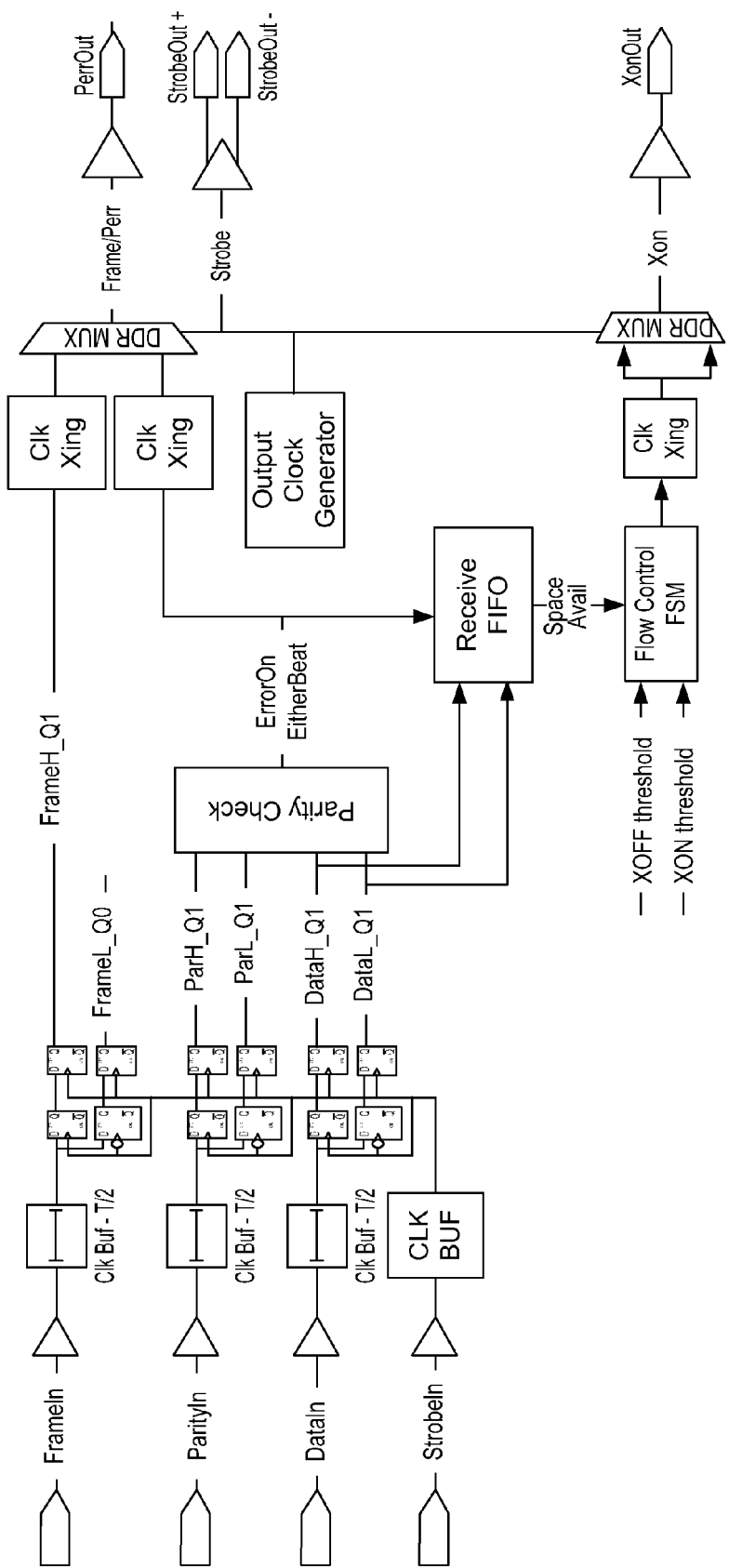
FIG. 4 is a logic diagram illustrating parity error recovery at a receiver in accordance with an embodiment of the present invention.

As stated above, the parity error signals can be used to measure the roundtrip delay, which may not be known a priori and, at the highest clock rates, can actually change with changes in temperature and voltage. This can be accomplished by first returning the received FrameIn signal to the transmitter on its parity error input and counting ticks from one or more frame transitions to the receipt of the same transition on a parity error input. As illustrated in FIG. 4, the Frame feedback signal is driven onto the PerrOut signal when the clock is high and the parity error indication is driven onto PerrOut when the clock is low. The PerrOut of the device at the receiving end of the link is connected to the PerrIn input of the device that is transmitting to it or complete the round trip connection whose delayed is measured as well. In this embodiment, the transmit FIFO must be at least as deep enough to account for the worst case replay delay. On the very first frame transmission after a reset, there are, of course, no other frame transitions in flight, so the first transition that returns on the parity error input coincident with the rising edge of a clock signal marks the roundtrip delay. Subsequent measurements can be guardbanded plus or minus one tick around this value (because the delay will change very slowly, if at all and accept assertions only within that range to avoid accepting a return from an earlier frame transition of a short packet.

Parity error feedback can be complicated by the presence of clock boundary crossings between transmitter and receiver at each end of the link. Transmitter and receiver clock signals are at the same frequency, but are at arbitrary phases relative to each other. If the interconnect is synchronous with the transmitter's core clock, as expected in the FPGA, then there is no clock crossing for parity error output at the transmitter. If it is asynchronous to the core clock as expected in non-FPGA devices, then minimal clock crossing FIFOs may be required.

Figure 5:
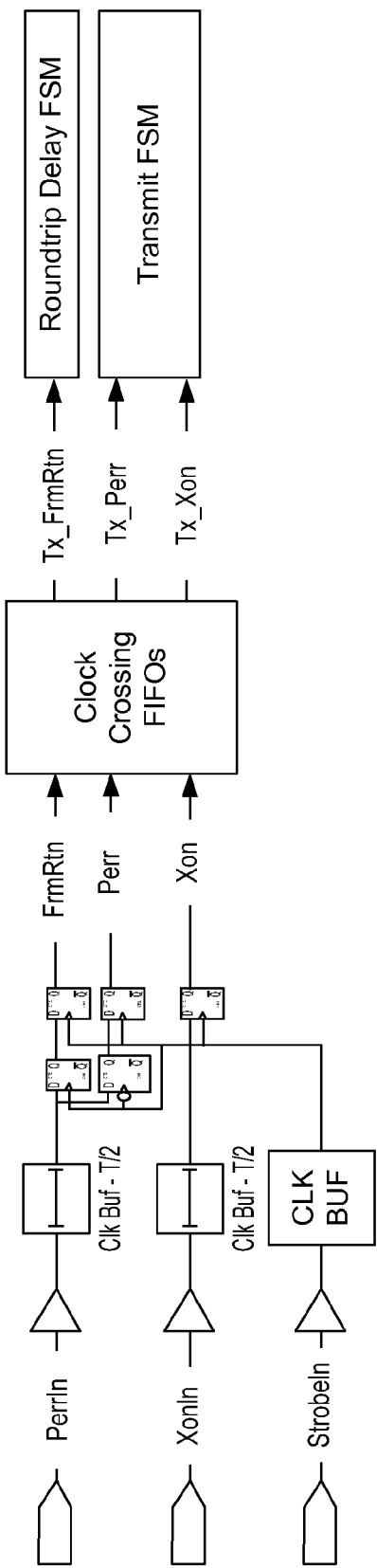
FIG. 5 is a logic diagram illustrating parity error recovery at a transmitter in accordance with an embodiment of the present invention.

The logic that is intended to implement the algorithm for both the receiver and the transmitter are depicted in FIGS. 4 and 5. FIG. 4 is a logic diagram illustrating parity error recovery at a receiver in accordance with an embodiment of the present invention. Parity is checked at the receiver pipe stage at which the data path width has been doubled. If a parity error is detected on either of the two paired beats, neither beat is entered into the receive FIFO. All subsequent beats are dropped silently until the framing logic decodes the start of replay. At that point, all subsequent beats are again captured into the receive FIFO.

FIG. 5 is a logic diagram illustrating parity error recovery at a transmitter in accordance with an embodiment of the present invention.

In both FIGS. 4 and 5, the clock crossings are counted as two cycles, because the transmitting device includes FIFOs to handle such clock crossings between synchronous transmissions and the two cycles are needed to account for the delay in those FIFOs. FIG. 4 shows four cycles of delay, plus input and output buffer delays, from parity input to parity error output. FIG. 5 shows input buffer delays plus four cycles until the feedback is presented to the transmit finite state machine (FSM). A delay measurement is required because the FPGA input buffer and the clock matching delays are on the order of 4 ns and thus can add several cycles to the roundtrip delay at 500 Mhz. In one implementation, at least 12 cycles are allowed and thus 24 beats of roundtrip delay in sizing its transmitter's replay buffer and its receivers input FIFO for flow control.

Figure 6:
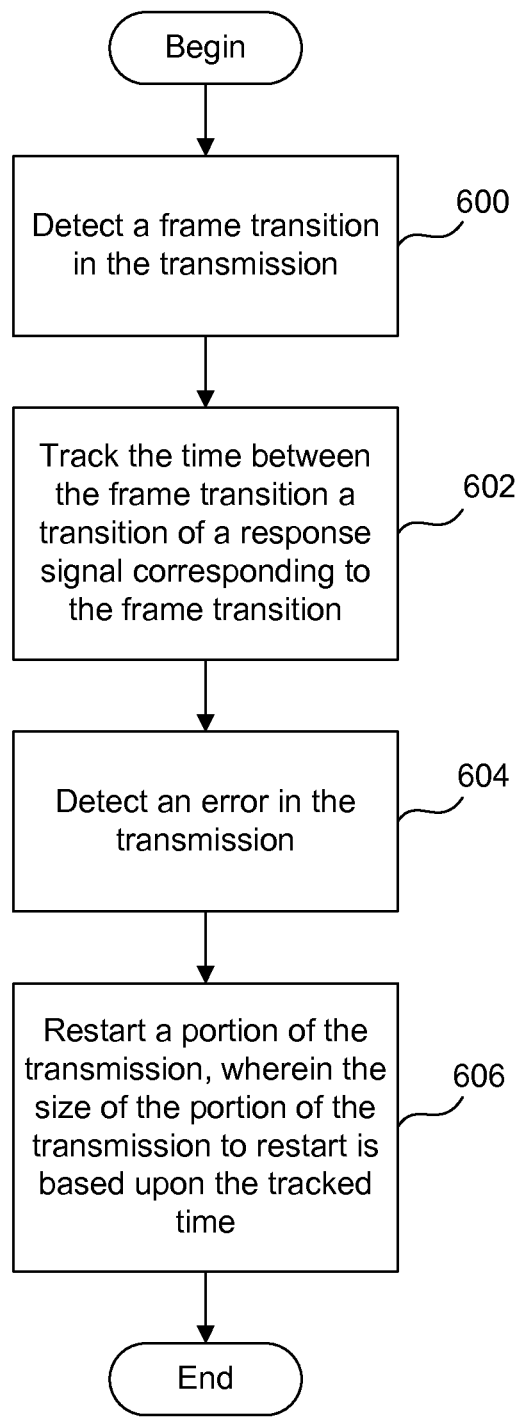
FIG. 6 is a flow diagram illustrating a method for error-correcting in a parallel interconnect transmitting device in accordance with an embodiment of the present invention.

FIG. 6 is a flow diagram illustrating a method for error-correcting in a parallel interconnect transmitting device in accordance with an embodiment of the present invention. In one embodiment, the method is implemented in a switch, but the method actually can be performed on either side of a parallel interconnect transmission medium, and thus can be performed in an FPGA, ASIC, or similar device as well.

At 600, a frame transition in a transmission from the transmitting device or a parallel interconnect receiving device is detected. At 602, time between the frame transition and a transition of a response signal corresponding to the frame transition received from the receiving device is tracked. In other words, this is the time between the outgoing frame transition and the returning frame transition multiplexed on the PerrIn signal. At 604, an error in the transmission is detected. The error may be, for example, a parity error. At 606, a portion of the transmission is restarted, wherein the size of the portion of the transmission to restart is based upon the tracked time between the frame transition and the transition of a response signal corresponding to the frame transition. That portion may be a potion between the present time and at least as far back as the first frame affected by the error. The portion of the transmission may be stored in a transmission FIFO buffer that is large enough to hold a worse-case replay delay, based upon the tracked time. It should also be noted that there is an additional optional step (not pictured), wherein if the parallel interconnect is asynchronous, the method can further adjust the size of the portion of the transmission to restart based upon delays in the FIFOs used to handle such clock crossings.

Figure 7:
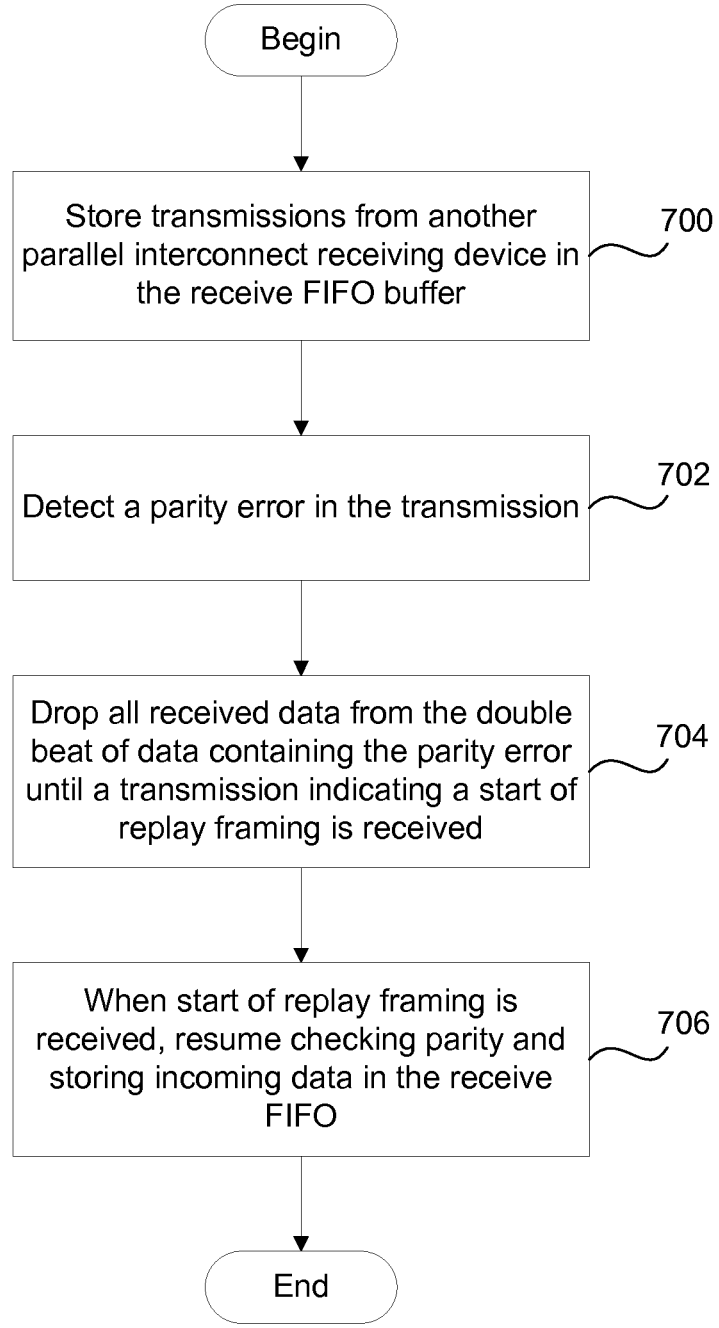
FIG. 7 is a flow diagram illustrating a method for error-correcting in a parallel interconnect receiving device in accordance with another embodiment of the present invention.

FIG. 7 is a flow diagram illustrating a method for error-correcting in a parallel interconnect receiving device in accordance with another embodiment of the present invention. At 700, transmissions from another parallel interconnect receiving device are stored in the receive FIFO buffer. At 702, a parity error is detected in the transmission from the another error-correcting parallel interconnect transmitting device. At 704, all received data from the double beat of data containing the parity error until a transmission indicating a start of replay framing is received is dropped. At 706, when a transmission indicating a start of replay framing is received, parity checking is resumed and incoming data is stored in the receive FIFO.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for error-correcting in a parallel interconnect link, the method comprising:
   at a parallel interconnect transmitting device at one end of the link:
      detecting a frame transition in a transmission from the transmitting device to a parallel interconnect receiving device at another end of the link;
      tracking time between the frame transition and a transition of a response signal corresponding to the frame transition received from the receiving device;
      detecting an error in the transmission; and
      restarting a portion of the transmission in response to the error, wherein the size of the portion of the transmission to restart is based upon the tracked time between the frame transition and the transition of a response signal corresponding to the frame transition;
   at a parallel interconnect receiving device at another end of the link:
      storing transmissions received from the error-correcting parallel interconnect transmitting device in a receive FIFO buffer;
      detecting a parity error in a transmission from the error-correcting parallel interconnect transmitting device; and
      dropping two-cycle's worth of the transmission prior to adding it to the receive FIFO buffer and ignoring all subsequent transmissions until a transmission indicating a start of replay framing is received.

2. The method of claim 1, wherein the portion of the transmission is a portion of the transmission between the present time and at least as far back as the first frame affected by the error.

3. The method of claim 2, further comprising:
   storing the portion of the transmission in a buffer that is large enough to hold a worst-case replay delay, based upon the tracked time.

4. The method of claim 1, wherein the parallel interconnect transmitting device includes first-in-first-out buffers (FIFOs) to handle clock crossings between asynchronous transmissions and the method further comprises:
   adjusting the size of the portion of the transmission to restart based upon delays in the FIFOs.

5. The method of claim 1, wherein the method is executed on a switch compatible with a parallel interconnect device and also compatible with a serial interconnect device.

6. The method of claim 5, wherein the serial interconnect device is a peripheral component interconnect express (PCIe) device.

7. An error-correcting parallel interconnect device having an interface including a transmitting device and a receiving device, comprising:
   a transmitter portion including:
      a transmit first-in-first-out (FIFO) buffer;
      an interface configured to:
      detect a frame transition in a transmission from the transmitting device to a parallel interconnect receiving device at another end of a link;
      track time between the frame transition and a transition of a response signal corresponding to the frame transition received from the receiving device at another end of the link;
      detect an error in the transmission; and
      restart a portion of the transmission stored in the transmit FIFO buffer, wherein the size of the portion of the transmission to restart is based upon the tracked time between the frame transition and the transition of a response signal corresponding to the frame transition; and
   a receiver portion including:
      a receiver FIFO buffer; and
      wherein the interface is further configured to:
      store transmissions received from another error-correcting parallel interconnect in the receive FIFO buffer;

detect a parity error in a transmission from another error-correcting parallel interconnect device; and drop two-cycle's worth of the transmission prior to adding it to the receive FIFO buffer and ignoring all subsequent transmissions from the another error-correcting parallel interconnect device until a transmission indicating a start of replay framing is received.

8. The error-correcting parallel interconnect device of claim 7, wherein the error-correcting parallel interconnect interface device is a switch.

9. The error-correcting parallel interconnect device of claim 7, wherein the error-correcting parallel interconnect interface device is a field programmable gate array (FPGA).

10. The error-correcting parallel interconnect device of claim 7, wherein the error-correcting parallel interconnect interface device is an application specific integrated circuit (ASIC).

11. An error-correcting parallel interconnect interface device comprising:
means for detecting a frame transition in a transmission from the interface device to a parallel interconnect receiving device;
means for tracking time between the frame transition and a transition of a response signal corresponding to the frame transition received from the receiving device;
means for detecting an error in the transmission;
means for restarting a portion of the transmission in response to the error, wherein the size of the portion of the transmission to restart is based upon the tracked time between the frame transition and the transition of a response signal corresponding to the frame transition; and
receive buffer means for storing transmissions from another error-correcting parallel interconnect transmitting device,
means for detecting a parity error in a transmission from the another error-correcting parallel interconnect transmitting device, and
means for dropping two-cycle's worth of the transmission prior to adding it to the receive buffer means and ignoring all subsequent transmissions from the another error-correcting parallel interconnect transmitting device until a transmission indicating a start of replay framing is received.

12. The error-correcting parallel interconnect interface device of claim 11, wherein the error-correcting parallel interconnect interface device is a switch.

13. The error-correcting parallel interconnect transmitting interface of claim 11, wherein the error-correcting parallel interconnect interface device is a field programmable gate array (FPGA).

14. The error-correcting parallel interconnect transmitting interface of claim 11, wherein the error-correcting parallel interconnect interface device is an application specific integrated circuit (ASIC).

15. A non-transitory machine readable storage medium tangibly embodying a program of instructions executable by the machine to perform a method for error-correcting in a parallel interconnect interface having a transmitting device and a receiving device, the method comprising:
detecting a frame transition in a transmission from the transmitting device to a parallel interconnect receiving device;
tracking time between the frame transition and a transition of a response signal corresponding to the frame transition received from the receiving device;

detecting an error in the transmission;
restarting a portion of the transmission in response to the error, wherein the size of the portion of the transmission to restart is based upon the tracked time between the frame transition and the transition of a response signal corresponding to the frame transition;
storing transmissions from another error-correcting parallel interconnect interface in a receive FIFO buffer;
detecting a parity error in a transmission from the another error-correcting parallel interconnect interface; and
dropping two-cycle's worth of the transmission prior to adding it to the receive FIFO buffer and ignoring all subsequent transmissions from the another error-correcting parallel interconnect interface until a transmission indicating a start of replay framing is received.

16. The non-transitory machine readable storage medium program of claim 15, wherein the portion of the transmission is a portion of the transmission between the present time and at least as far back as the first frame affected by the error.

17. The non-transitory machine readable storage medium of claim 16, wherein the method further comprises:
storing the portion of the transmission in a buffer that is large enough to hold a worst-case replay delay, based upon the tracked time.

18. The non-transitory machine readable storage medium of claim 15, wherein the parallel interconnect transmitting device includes first-in-first-out buffers (FIFOs) to handle clock crossings between asynchronous transmissions and the method further comprises:
adjusting the size of the portion of the transmission to restart based upon delays in the FIFOs.

19. A method for error-correcting in an error-correcting parallel interconnect receive device, the method comprising:
detecting a parity error in a transmission received from an error-correcting parallel interconnect transmitting device;
signaling detection of the parity error to the error-correcting parallel interconnect transmitting device; and
dropping two-cycle's worth of the transmission prior to adding it to a receive FIFO buffer and ignoring all subsequent transmissions from the error-correcting parallel interconnect transmitting device until a transmission indicating a start of replay framing is received.

20. An error-correcting parallel interconnect receive device comprising:
a receive FIFO buffer; and
an interface configured to:
store transmissions received from an error-correcting parallel interconnect transmitting device in the receive FIFO buffer;
detect a parity error in the transmission from the error-correcting parallel interconnect transmitting device;
signal detection of the parity error to the error-correcting parallel interconnect transmitting device; and
drop two-cycle's worth of the transmission prior to adding it to the receive FIFO buffer and ignoring all subsequent transmissions from the error-correcting parallel interconnect transmitting device until a transmission indicating a start of replay framing is received.

21. An error-correcting parallel interconnect receiving device comprising:
receive buffer means for storing transmissions received from a parallel interconnect transmitting device,
means for detecting a parity error in a transmission from the error-correcting parallel interconnect transmitting device;

means for signaling detection of the parity error to the error-correcting parallel interconnect transmitting device, and means for dropping two-cycle's worth of the transmission prior to adding it to the receive buffer means and ignoring all subsequent transmissions from the error-correcting parallel interconnect transmitting device until a transmission indicating a start of replay framing is received.

* * * * *